United States Patent
Nakayama (10) Patent No.: US 9,450,235 B2
(45) Date of Patent: Sep. 20, 2016

(54) ANODE ACTIVE MATERIAL FOR SODIUM ION BATTERY AND SODIUM ION BATTERY

(71) Applicant: TOYOTA JIDOSHA KABUSHIKI KAISHA, Toyota-shi, Aichi-ken (JP)

(72) Inventor: Hideki Nakayama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/817,681

(22) Filed: Aug. 4, 2015

(65) Prior Publication Data
US 2016/0064728 A1  Mar. 3, 2016

(30) Foreign Application Priority Data
Sep. 3, 2014  (JP) .................. 2014-179057

(51) Int. Cl.
*H01M 4/36* (2006.01)
*H01M 10/054* (2010.01)
*H01M 4/583* (2010.01)
*H01M 4/48* (2010.01)
*H01M 4/62* (2006.01)
*H01M 4/485* (2010.01)
*H01M 4/02* (2006.01)

(52) U.S. Cl.
CPC .............. *H01M 4/364* (2013.01); *H01M 4/48* (2013.01); *H01M 4/485* (2013.01); *H01M 4/583* (2013.01); *H01M 4/625* (2013.01); *H01M 10/054* (2013.01); *H01M 2004/027* (2013.01)

(58) Field of Classification Search
CPC ...... H01M 4/364; H01M 4/48; H01M 4/583; H01M 4/625; H01M 10/054; H01M 2004/27
See application file for complete search history.

(56) References Cited

FOREIGN PATENT DOCUMENTS

| JP | 10-255796 A | | 9/1998 |
|---|---|---|---|
| JP | CN 101232095 | * | 7/2008 |
| JP | 2013-137907 A | | 7/2013 |
| JP | 2014-078350 A | | 5/2014 |

OTHER PUBLICATIONS

Liu et al. "Lithium niobate nanoflakes as eletrodes for highly stable electrochemical supercapacitor devices", Materials Letters (2014), 119, pp. 84-87.*
Jian et al. "LiNb3O8 as a novel anode material for lithium-ion batteries", Electrochemistry Communications (2011), 13(10), pp. 1127-1130.*

* cited by examiner

*Primary Examiner* — Laura Weiner
(74) *Attorney, Agent, or Firm* — Oliff PLC (57) ABSTRACT

The present invention aims to provide an anode active material for a sodium ion battery with favorable rate characteristic. The object is attained by providing an anode active material for a sodium ion battery comprising an active substance having an $MNb_3O_8$ phase belonging to an orthorhombic crystal (M is at least one kind of H, Li, Na and K), and a carbon material contacting with the active substance, wherein the active substance and the carbon material are composited.

4 Claims, 5 Drawing Sheets

FIG. 5A
COMPARATIVE EXAMPLE 1
($KNb_3O_8$)

FIG. 5B
EXAMPLE 1
($KNb_3O_8$+BM PROCESS with VGCF+Ar FIRING)

FIG. 5C
EXAMPLE 2
($KNb_3O_8$+BM PRPCESS with VGCF)

ANODE ACTIVE MATERIAL FOR SODIUM ION BATTERY AND SODIUM ION BATTERY

TECHNICAL FIELD

The present invention relates to an anode active material for a sodium ion battery with favorable rate characteristic.

BACKGROUND ART

A sodium ion battery is a battery such that an Na ion moves between a cathode and an anode. Na exists so abundantly as compared with Li that the sodium ion battery has the advantage that lower costs are easily intended as compared with a lithium ion battery. Generally, the sodium ion battery has a cathode active material layer containing a cathode active material, an anode active material layer containing an anode active material, and an electrolyte layer formed between the cathode active material layer and the anode active material layer.

An anode active material used for the sodium ion secondary battery is under active research. For example, in Patent Literature 1, it is described that hard carbon is used as an anode active material for the sodium ion battery. In Patent Literature 2, an anode active material having an $Na_2Ti_6O_{13}$ crystal phase is described. In Patent Literature 2, it is described that a carbon material is used as a conductive material, where interlayer distance d002 is 3.5 Å or less or D/G ratio measured by Raman spectroscopy measurement is 0.8 or less. Meanwhile, in Patent Literature 3, an Nb oxide is disclosed as an active substance for insertion and desorption of an Li ion, not an Na ion.

CITATION LIST

Patent Literature

Patent Literature 1: Japanese Patent Application Publication (JP-A) No. 2013-137907
Patent Literature 2: JP-A No. 2014-078350
Patent Literature 3: JP-A No. H10-255796

SUMMARY OF INVENTION

Technical Problem

For example, in the case where hard carbon described in Patent Literature 1 is used as an anode active material of the sodium ion battery, the problem is that hard carbon is so low in action potential as an active substance that metal Na is easily precipitated. Thus, safety of the battery is deteriorated.

Through earnest studies for solving the problem, the present inventor of the present invention has found out that the use of an Nb oxide of an $MNb_3O_8$ phase belonging to an orthorhombic crystal (M is at least one kind of H, Li, Na and K) as an anode active material of the sodium ion battery allows an improvement in safety of the battery to be intended. Meanwhile, the problem is that the anode active material of an $MNb_3O_8$ phase belonging to an orthorhombic crystal is low in rate characteristic. The present invention has been made in view of the above circumstances, and a main object thereof is to provide an anode active material for a sodium ion battery with favorable rate characteristic.

Solution to Problem

In order to achieve the object described above, the present invention provides an anode active material for a sodium ion battery comprising an active substance having an $MNb_3O_8$ phase belonging to an orthorhombic crystal (M is at least one kind of H, Li, Na and K), and a carbon material contacting the active substance, wherein the active substance and the carbon material are composited.

According to the present invention, the compositing of the active substance and the carbon material allows rate characteristic of the battery to be made favorable.

In the invention described above, the carbon material is preferably such that interlayer distance d002 is 3.5 Å or less and D/G ratio measured by Raman spectroscopy measurement is 0.8 or less. The reason therefor is to allow reversible capacitance to be made favorable.

In the invention described above, crystallite size of the $MNb_3O_8$ phase is preferably 120 Å or less. The reason therefor is to facilitate potential control of charging state of the battery.

The present invention provides a sodium ion battery comprising: a cathode active material layer containing a cathode active material, an anode active material layer containing an anode active material, and an electrolyte layer formed between the cathode active material layer and the anode active material layer, wherein the anode active material is the anode active material for a sodium ion battery described above.

According to the present invention, the use of the anode active material for a sodium ion battery described above allows the sodium ion battery with favorable rate characteristic.

Advantageous Effects of Invention

An anode active material for a sodium ion battery of the present invention produces the effect such that rate characteristic is favorable.

DESCRIPTION OF EMBODIMENTS

An anode active material for a sodium ion battery and a sodium ion battery of the present invention are hereinafter described in detail.

A. Anode Active Material for Sodium Ion Battery

First, an anode active material for a sodium ion battery of the present invention is described. The anode active material for a sodium ion battery of the present invention comprises an active substance comprising an $MNb_3O_8$ phase belonging to an orthorhombic crystal (M is at least one kind of H, Li, Na and K), and a carbon material contacting with the active substance, wherein the active substance and the carbon material are composited.

"The active substance and the carbon material are composited" ordinarily signifies a state obtained by subjecting both of them to mechanochemical treatment. Examples thereof include a state such that both of them are dispersed so as to be closely stuck to each other in a nano order, and a state such that one is dispersed so as to be closely stuck to the surface of the other in a nano order. Incidentally, a chemical bond may exist between the both. The composited state may be confirmed by SEM observation, TEM observation, TEM-EELS method and X-ray absorption fine structure (XAFS), and the like. Examples of the mechanochemical treatment include treatment to allow mechanical energy, such as a ball mill. A commercially available composite device (e.g., Nobilta™, manufactured by Hosokawa Micron Corp.) may be used. In the present invention, the carbon material is preferably disposed between primary particles of the active substance in contact therewith.

According to the present invention, the compositing of the active substance and the carbon material allows rate characteristic of the battery to be made favorable.

The reason therefor is not necessarily clear but is guessed as follows.

The compositing of the active substance and the carbon material allows the carbon material to be disposed between particles (such as primary particles) of the active substance in contact therewith, so that it is guessed that the carbon material functions as an electron conduction path. Thus, it is guessed that electron conductivity of the anode active material for a sodium ion battery of the present invention may be improved. It is also guessed that the improvement of electron conductivity allows rate characteristic of the anode active material for a sodium ion battery to be made favorable.

Each constitution of the anode active material for a sodium ion battery of the present invention is hereinafter described.

1. Active Substance

The active substance used for the present invention comprises an $MNb_3O_8$ phase belonging to an orthorhombic crystal (M is at least one kind of H, Li, Na and K). Incidentally, the presence of the $MNb_3O_8$ phase may be confirmed by X-ray diffraction (XRD) measurement. With regard to the $MNb_3O_8$ phase, in X-ray diffraction measurement using a CuKα ray, typical peaks ordinarily appear in 2θ=8.35°, 12.99°, 16.75°, 19.50°, 23.78°, 26.14°, 26.63°, 28.48°, 31.21°, 31.62°, 32.22°, and 33.86°. Incidentally, these peak positions are, strictly speaking, peak positions of a $KNb_3O_8$ phase, and have a possibility of shifting somewhat in accordance with kinds of M. Thus, the peak positions may be within a range of ±2.00° or within a range of ±1.00°. In addition, examples of a space group of the $MNb_3O_8$ phase include Amam.

The active substance used for the present invention is preferably large in the ratio of the $MNb_3O_8$ phase; specifically, the anode active material preferably contains the $MNb_3O_8$ phase mainly. Here, "containing the $MNb_3O_8$ phase mainly" signifies that the ratio of the $MNb_3O_8$ phase is the largest in all crystal phases contained in the anode active material. The ratio of the $MNb_3O_8$ phase contained in the anode active material is preferably 50 mol % or more, more preferably 60 mol % or more, and far more preferably 70 mol % or more. In addition, the active substance used for the present invention may comprise only the $MNb_3O_8$ phase (a single-phase active substance). Incidentally, the ratio of the $MNb_3O_8$ phase contained in the anode active material may be determined by a quantitative analysis method through X-ray diffraction (e.g., a quantification method by R-value and a Rietveld method).

In the present invention, part of Nb in the $MNb_3O_8$ phase may be substituted with another metallic element Me. This case may be represented as an $M(Nb_{3-x}Me_x)O_8$ phase ($0<x<3$). The substitution of part of Nb with another metallic element Me improves electron conductivity. The valence number of another metallic element Me is not particularly limited but examples thereof include divalence to pentavalence (divalence, trivalence, tetravalence and pentavalence); above all, divalence to tetravalence are preferable. The reason therefor is that the valence number of Nb in the $MNb_3O_8$ phase is pentavalence, so that the substitution with a metallic element except pentavalence improves electron conductivity further. As a result, at least one of charge and discharge efficiency and rate characteristics is improved. In particular, the improvement of electron conductivity has a great influence on the improvement of rate characteristics. The reason why the substitution of Nb (pentavalence) with Me different in valence number improves electron conductivity is guessed to be that Me works like a dopant in a semiconductor to smoothen electron transfer.

Examples of another metallic element Me include a transition metallic element, and include Ti, Sc, Zr, Y, La, V, Cr, Mn, Fe, Zr, Mo, Ta and W, above all. When a state in which part of Nb in the $MNb_3O_8$ phase is substituted with another metallic element Me is regarded as $M(Nb_{3-x}Me_x)O_8$, the value of "x" is preferably a value at which an impurity peak (such as another crystal phase containing Me) is not observed in XRD measurement. The reason therefor is that at least one of electron conductance and ion conductance may be restrained from deteriorating. For example, when Me is a Ti element, the value of "x" is preferably adjusted so that peaks such as $KTiNbO_5$, $Ti_2Nb_6O_{12}$ and $TiO_2$ may not be observed in XRD measurement.

Ordinarily "x" satisfies $0<x$ and preferably satisfies $0.001 \leq x$, more preferably $0.003 \leq x$, far more preferably $0.005 \leq x$. Meanwhile, for example, "x" satisfies $x \leq 0.3$ and preferably satisfies $x \leq 0.1$. In particular, when Me is Ti, "x" preferably satisfies $0.005 \leq x \leq 0.02$. The reason therefor is that an improvement in charge and discharge efficiency and rate characteristics may be intended. Incidentally, the substitution rate of Nb with Me may be represented as x/3, and a preferable range of the substitution rate may be obtained by multiplying the above-mentioned range of "x" by one-third times.

In the present invention, M in the $MNb_3O_8$ phase is ordinarily at least one kind of H, Li, Na and K. M may be any one kind of H, Li, Na and K, or two kinds or more thereof. Above all, M preferably has at least one kind of H, Li and Na. The reason therefor is that an improvement in capacity may be intended as compared with the case where M is only K. The active substance used for the present invention may be such that part or all of K in the $KNb_3O_8$ phase is substituted with another element A (A is at least one kind of H, Li and Na). Part of Nb in the $KNb_3O_8$ phase may be substituted with another metallic element Me. This case may be represented as an $K_{1-y}A_y(Nb_{3-x}Me_x)O_8$ phase ($0 \leq x < 3$, $0 \leq y \leq 1$). Examples of a method for forming an active substance in which K in the $KNb_3O_8$ phase is substituted with another element A include an ion exchange method for ion-exchanging K in the $KNb_3O_8$ phase with another element A. Examples of another forming method include a solid-phase method.

The active substance used for the present invention contains an M element, an Nb element and an O element, and has the $MNb_3O_8$ phase described above. In addition, the anode active material may contain the Me element described above. The composition of the active substance used for the present invention is not particularly limited as long as the composition has the crystal phase described above. Above all, the active substance used for the present invention preferably has a composition of an $M(Nb_{3-x}Me_x)O_8$ phase ($0 \leq x < 3$). Me and "x" are the same as the contents described above.

The crystallite size of the $MNb_3O_8$ phase is not particularly limited but preferably small, for example, preferably 120 Å or less, more preferably 100 Å or less. The crystallite size of the $MNb_3O_8$ phase is, for example, 30 Å or more.

As shown in the charge and discharge curve of evaluation batteries of Examples 1 and 2, the reason therefor is that the decrease of the crystallite size of the $MNb_3O_8$ phase allows a potential flat part of the charge and discharge curve to disappear and allows potential control of the charging state to be facilitated. For example, the charging state of the battery may be monitored and controlled by voltage.

The reason to allow a potential flat part of the charge and discharge curve to disappear is not necessarily clear but is guessed as follows. That is to say, it is guessed that the electric potential of two-phase coexistence is broadened for the reason that the decrease of the crystallite size of the $MNb_3O_8$ phase causes crystallinity to deteriorate. In addition, it is guessed that the degree of freedom in a crystal structure allows the electric potential to be broadened.

The crystallite size of the $MNb_3O_8$ phase may be calculated from a half-value width of a peak obtained by the XRD measurement. For example, in the case of the $KNb_3O_8$ phase, the crystallite size may be calculated by the Scherrer's formula with the use of full width at half maximum (FWHM) of the peak of $2\theta = 26.14°$.

$$D = K\lambda/(\beta \cos \theta)$$

K: Scherrer constant, $\lambda$: wavelength, $\beta$: spread of diffraction line by size of crystallite, $\theta$: angle of diffraction $2\theta/\theta$ The shape of the active substance used for the present invention is preferably a particulate shape, for example. The average particle diameter thereof ($D_{50}$) is preferably, for example from 1 nm to 100 μm, above all from 10 nm to 30 μm.

A method for forming the active substance used for the present invention is not particularly limited as long as the method allows the active material described above, but examples thereof include a solid-phase method, a sol-gel method, a spray-drying method, an atomized pyrolysis method, a hydrothermal method and a coprecipitation method.

2. Carbon Material

The carbon material used for the present invention is composited with the active substance described above. Specific examples of the carbon material used for the present invention include carbon black such as acetylene black, Ketjen Black, furnace black and thermal black; carbon fiber such as VGCF; carbon nanotube; graphite such as artificial graphite, natural graphite and expanded graphite; hard carbon; coke; and graphene.

The carbon material is preferably high in crystallinity. The reason therefor is that crystallinity of the carbon material is so high that an Na ion is inserted into the carbon material with difficulty and irreversible capacitance due to Na ion insertion may be decreased. Further, the reason therefor is to allow electron conductivity to be made favorable and allow reversible capacitance to be improved. The crystallinity of the carbon material may be prescribed by interlayer distance d002 and D/G ratio, for example.

With regard to the carbon material, the interlayer distance d002 is, for example, preferably 3.5 Å or less, more preferably 3.4 Å or less. The reason therefor is to allow the carbon material with high crystallinity. The interlayer distance d002 is ordinarily 3.36 Å or more. The interlayer distance d002 signifies interplanar spacing of (002) plane in the carbon material, and specifically corresponds to a distance between graphene layers. The interlayer distance d002 may be measured from a peak obtained by an X-ray diffraction (XRD) method with the use of a $CuK\alpha$ ray, for example.

With regard to the carbon material, the D/G ratio measured by Raman spectroscopy measurement is, for example, preferably 0.8 or less, more preferably 0.7 or less, far more preferably 0.5 or less. The reason therefor is to allow the carbon material with high crystallinity. The D/G ratio signifies peak intensity of D-band derived from a defect structure in the vicinity of 1350 $cm^{-1}$ with respect to peak intensity of G-band derived from a graphite structure in the vicinity of 1590 $cm^{-1}$, which are observed in Raman spectroscopy measurement (a wavelength of 532 nm).

With regard to the carbon material, it is more preferable that the interlayer distance d002 is the value described above or less and the D/G ratio is the value described above or less. The reason therefor is that the carbon material has higher crystallinity, resulting in allowing reversible capacitance to be improved.

The ratio of the composited carbon material in the anode active material for a sodium ion battery is, for example, preferably from 0.1% by weight to 60% by weight, more preferably from 1% by weight to 30% by weight, far more preferably from 5% by weight to 20% by weight. The reason therefor is that too small ratio of the composited carbon material brings a possibility of not allowing the improvement of electron conductivity to be sufficiently intended, whereas too large ratio of the composited carbon material brings a possibility of relatively decreasing the amount of the active material to reduce the capacity.

The carbon material is composited with the active substance described above by the above-mentioned mechanochemical treatment. Examples of the mechanochemical treatment include ball mill. The rotational speed of ball mill is, for example, preferably from 10 rpm to 500 rpm, more preferably from 50 rpm to 300 rpm, far more preferably from 100 rpm to 200 rpm. The treating time of ball mill is, for example, preferably from 1 hour to 100 hours, more preferably from 5 hours to 50 hours, far more preferably from 10 hours to 30 hours.

3. Others

The present invention may provide a method for producing a sodium ion battery, comprising a compositing step of preparing an active substance comprising an $MNb_3O_8$ phase belonging to an orthorhombic crystal (M is at least one kind of H, Li, Na and K) and a carbon material to composite the active substance and the carbon material by making the active substance in contact with the carbon material. The mechanochemical treatment described above may be performed in the compositing step.

B. Sodium Ion Battery

Figure 1:
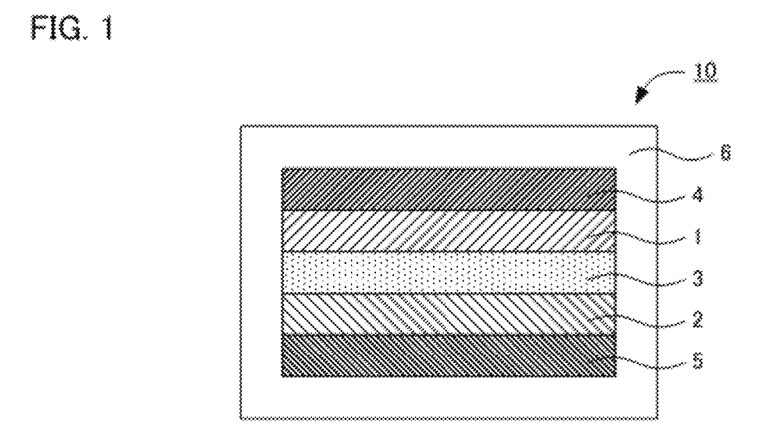
FIG. 1 is a schematic cross-sectional view showing an example of a sodium ion battery of the present invention.

FIG. 1 is a schematic cross-sectional view showing an example of a sodium ion battery of the present invention. A sodium ion battery 10 shown in FIG. 1 comprises a cathode active material layer 1, an anode active material layer 2, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. The anode active material layer 2 contains the anode active material described in the "A. Anode active material for sodium ion battery".

According to the present invention, the use of the anode active material for a sodium ion battery described above allows the sodium ion battery with favorable rate characteristic.

1. Anode Active Material Layer

First, the anode active material layer in the present invention is described. The anode active material layer in the present invention is a layer containing at least the anode active material. The anode active material layer may contain at least one of a conductive material, a binder and a solid electrolyte material in addition to the anode active material.

The anode active material in the present invention is ordinarily the anode active material described in the "A. Anode active material for sodium ion battery".

The conductive material is not particularly limited as long as the conductive material has desired electron conductivity, but examples thereof include a carbon material and a metallic material, preferably a carbon material among them. The carbon material may be used while appropriately selecting from among such as to be described in the item of "A. Anode active material for sodium ion battery". Examples of the metallic material include Fe, Cu, Ni and Al.

The binder is not particularly limited as long as the binder is stable chemically and electrically, but examples thereof include fluorine-based binders such as polyvinylidene fluoride (PVDF) and polytetrafluoroethylene (PTFE), rubber-based binders such as styrene-butadiene rubber, imide-based binders such as polyimide, olefin-based binders such as polypropylene (PP) and polyethylene (PE), and cellulose-based binders such as carboxymethyl cellulose (CMC). The solid electrolyte material is not particularly limited as long as the material has desired ion conductivity, but examples thereof include an oxide solid electrolyte material and a sulfide solid electrolyte material. Incidentally, the solid electrolyte material is described in detail in the after-mentioned "3. Electrolyte layer".

The content of the anode active material in the anode active material layer is preferably larger from the viewpoint of capacity; preferably, for example from 60% by weight to 99% by weight, above all from 70% by weight to 95% by weight. The content of the conductive material is preferably smaller if the material may secure desired electron conductivity; preferably, for example from 5% by weight to 80% by weight, above all from 10% by weight to 40% by weight. The reason therefor is that too small content of the conductive material brings a possibility of not allowing sufficient electron conductivity, whereas too large content of the conductive material brings a possibility of relatively decreasing the amount of the active material to reduce the capacity. The content of the binder is preferably smaller if the binder may stably fix the anode active material; preferably, for example from 1% by weight to 40% by weight. The reason therefor is that too small content of the binder brings a possibility of not allowing sufficient binding property, whereas too large content of the binder brings a possibility of relatively decreasing the amount of the active material to reduce the capacity. The content of the solid electrolyte material is preferably smaller if the material may secure desired ion conductivity; preferably, for example from 1% by weight to 40% by weight. The reason therefor is that too small content of the solid electrolyte material brings a possibility of not allowing sufficient ion conductivity, whereas too large content of the solid electrolyte material brings a possibility of relatively decreasing the amount of the active material to reduce the capacity.

The thickness of the anode active material layer varies greatly with the constitution of the battery, and is preferably from 0.1 μm to 1000 μm, for example.

2. Cathode Active Material Layer

Next, the cathode active material layer in the present invention is described. The cathode active material layer in the present invention is a layer containing at least the cathode active material. The cathode active material layer may contain at least one of a conductive material, a binder and a solid electrolyte material in addition to the cathode active material.

Examples of the cathode active material include bed type active materials, spinel type active materials, and olivine type active materials. Specific examples of the cathode active material include $NaFeO_2$, $NaNiO_2$, $NaCoO_2$, $NaMnO_2$, $NaVO_2$, $Na(Ni_xMn_{1-x})O_2$ (0<X<1), $Na(Fe_xMn_{1-x})O_2$ (0<X<1), $NaVPO_4F$, $Na_2FePO_4F$, $Na_3V_2(PO_4)_3$, and $Na_4M_3(PO_4)_2P_2O_7$ (M is at least one kind of Co, Ni, Fe and Mn).

The shape of the cathode active material is preferably a particulate shape. The average particle diameter of the cathode active material ($D_{50}$) is preferably, for example from 1 nm to 100 μm, above all from 10 nm to 30 μm. The content of the cathode active material in the cathode active material layer is preferably larger from the viewpoint of capacity; preferably, for example from 60% by weight to 99% by weight, above all from 70% by weight to 95% by weight. The kinds and content of the conductive material, the binder and the solid electrolyte material used for the cathode active material layer are the same as the contents described in the anode active material layer described above; therefore, the description herein is omitted. The thickness of the cathode active material layer varies greatly with the constitution of the battery, and is preferably from 0.1 μm to 1000 μm, for example.

3. Electrolyte Layer

Next, the electrolyte layer in the present invention is described. The electrolyte layer in the present invention is a layer formed between the cathode active material layer and the anode active material layer. Ion conduction between the cathode active material and the anode active material is performed through the electrolyte contained in the electrolyte layer. The form of the electrolyte layer is not particularly limited but examples thereof include a liquid electrolyte layer, a gel electrolyte layer and a solid electrolyte layer.

The liquid electrolyte layer is ordinarily a layer obtained by using a nonaqueous liquid electrolyte. The nonaqueous liquid electrolyte ordinarily contains a sodium salt and a nonaqueous solvent. Examples of the sodium salt include inorganic sodium salts such as $NaPF_6$, $NaBF_4$, $NaClO_4$ and $NaAsF_6$; and organic sodium salts such as $NaCF_3SO_3$, $NaN(CF_3SO_2)_2$, $NaN(C_2F_5SO_2)_2$, $NaN(FSO_2)_2$ and $NaC(CF_3SO_2)_3$.

The nonaqueous solvent is not particularly limited as long as the solvent dissolves the sodium salt. Examples of the high-dielectric-constant solvent include cyclic ester (cyclic carbonate) such as ethylene carbonate (EC), propylene carbonate (PC) and butylene carbonate (BC), γ-butyrolactone, sulfolane, N-methylpyrrolidone (NMP), and 1,3-dimethyl-2-imidazolidinone (DMI). Meanwhile, examples of the low-viscosity solvent include chain ester (chain carbonate) such as dimethyl carbonate (DMC), diethyl carbonate (DEC) and ethyl methyl carbonate (EMC), acetates such as methyl acetate and ethyl acetate, and ether such as 2-methyltetrahydrofuran. A mixed solvent such that the high-dielectric-constant solvent and the low-viscosity solvent are mixed may be used.

The concentration of the sodium salt in the nonaqueous liquid electrolyte is, for example, from 0.3 mol/L to 5 mol/L, preferably from 0.8 mol/L to 1.5 mol/L. The reason therefor is that too low concentration of the sodium salt brings a possibility of causing capacity reduction during high rate, whereas too high concentration of the sodium salt brings a possibility of increasing viscosity to cause capacity reduction at low temperature. Incidentally, a low-volatile liquid such as an ionic liquid may be used as the nonaqueous liquid electrolyte.

The gel electrolyte layer may be obtained by adding and gelating a polymer to a nonaqueous liquid electrolyte, for example. Specifically, gelation may be performed by adding polymers such as polyethylene oxide (PEO), polyacrylonitrile (PAN) or polymethyl methacrylate (PMMA) to a nonaqueous liquid electrolyte.

The solid electrolyte layer is a layer obtained by using the solid electrolyte material. The solid electrolyte material is not particularly limited as long as the material has Na ion conductivity, but examples thereof include an oxide solid electrolyte material and a sulfide solid electrolyte material. Examples of the oxide solid electrolyte material include $Na_3Zr_2Si_2PO_{12}$ and β alumina solid electrolyte (such as $Na_2O\text{-}11Al_2O_3$). Examples of the sulfide solid electrolyte material include $Na_2S\text{—}P_2S_5$.

The solid electrolyte material may be amorphous or crystalline. The shape of the solid electrolyte material is preferably a particulate shape. The average particle diameter of the solid electrolyte material ($D_{50}$) is preferably, for example from 1 nm to 100 μm, above all from 10 nm to 30 μm.

The thickness of the electrolyte layer varies greatly with kinds of the electrolyte and constitutions of the battery, and is preferably, for example from 0.1 μm to 1000 μm, above all from 0.1 μm to 300 μm.

4. Other Constitutions

The sodium ion battery of the present invention comprises at least the anode active material layer, cathode active material layer and electrolyte layer described above, ordinarily further comprising a cathode current collector for collecting the cathode active material layer and an anode current collector for collecting the anode active material layer. Examples of a material for the cathode current collector include SUS, aluminum, nickel, iron, titanium and carbon. Meanwhile, examples of a material for the anode current collector include SUS, copper, nickel and carbon. Examples of the shape of the current collectors include a foil shape, a mesh shape and a porous shape. In addition, a method for forming the active material layers on the current collectors is not particularly limited but examples thereof include a doctor blade method, an electrostatic coating method, a dip coat method and a spray coat method.

The sodium ion battery of the present invention may include a separator between the cathode active material layer and the anode active material layer. The reason therefor is to allow the battery with higher safety. A material for the separator may be an organic material or an inorganic material. Specific examples thereof include porous membranes such as polyethylene (PE), polypropylene (PP), cellulose and polyvinylidene fluoride; and nonwoven fabrics such as resin nonwoven fabric and glass fiber nonwoven fabric. The separator may be a single-layer structure (such as PE and PP) or a laminated structure (such as PP/PE/PP). A case for a general battery may be used as a battery case. Examples of the battery case include a battery case made of SUS.

5. Sodium Ion Battery

The sodium ion battery of the present invention is not particularly limited as long as the battery has the cathode active material layer, anode active material layer and electrolyte layer described above. The sodium ion battery of the present invention may be a battery in which the electrolyte layer is the solid electrolyte layer, a battery in which the electrolyte layer is the liquid electrolyte layer, or a battery in which the electrolyte layer is the gel electrolyte layer. In addition, the sodium ion battery of the present invention may be a primary battery or a secondary battery, preferably a secondary battery among them. The reason therefor is to be repeatedly charged and discharged and be useful as a car-mounted battery, for example. Examples of the shape of the sodium ion battery of the present invention include a coin shape, a laminate shape, a cylindrical shape and a rectangular shape. A producing method for the sodium ion battery is not particularly limited but is the same as a producing method for a general sodium ion battery.

Incidentally, the present invention is not intended to be limited to the embodiment described above. The embodiment described above is given only for illustrative purposes, and any embodiment having substantially the same configuration as the technical idea described in the claims of the present invention and provides similar operating effects, is construed to be included in the technical scope of the present invention.

EXAMPLES

The present invention is described more specifically while showing examples hereinafter.

Comparative Example 1

$KNO_3$ and $Nb_2O_5$ as raw materials were weighed at a molar ratio of $KNO_3:Nb_2O_5=2:3$, and kneaded in ethanol. Thereafter, the solution was molded into pellets, which were burned in a muffle furnace on the conditions of 600° C. and 2 hours. Thereafter, the pellets were further ground and molded, and burned again in a muffle furnace on the conditions of 700° C. and 19 hours. Thus, an active substance having a composition of $KNb_3O_8$ was obtained.

Comparative Example 2

$KNb_3O_8$ synthesized in Comparative Example 1 was subject to ball milling process by using $ZrO_2$ ball at the number of revolutions of 180 rpm×24 hours to obtain an active substance.

Example 1

$KNb_3O_8$ synthesized in Comparative Example 1 and a carbon material with high crystallinity (VGCF, interlayer distance d002=3.37 Å, D/G ratio=0.07) were mixed at a weight ratio of $KNb_3O_8$:VGCF=90:10, and subjected to ball milling process by using $ZrO_2$ ball at the number of revolutions of 180 rpm×24 hours. Thereafter, they were heat-treated under an Ar atmosphere at a temperature of 700° C. for 5 hours. Thus, an active substance with VGCF composited was obtained.

Example 2

$KNb_3O_8$ synthesized in Comparative Example 1 and a carbon material with high crystallinity (VGCF, interlayer distance d002=3.37 Å, D/G ratio=0.07) were mixed at a weight ratio of KNb₃O₈:VGCF=90:10, and subjected to ball milling process by using ZrO₂ ball at the number of revolutions of 180 rpm×24 hours to obtain an active substance with VGCF composited.

[Evaluations]

(X-Ray Diffraction Measurement)

Figure 2A:
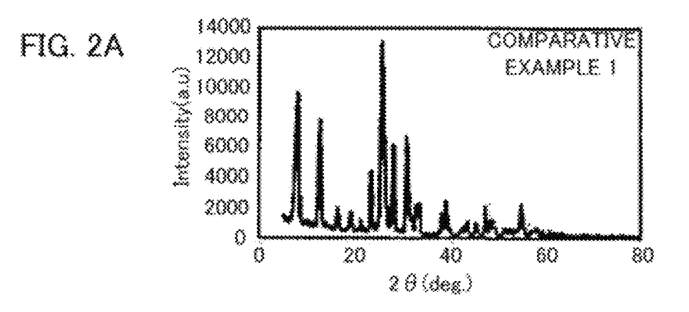
FIGS. 2A to 2D are results of measuring XRD of active substances each obtained in Comparative Examples 1 and 2 and Examples 1 and 2.
Figure 2B:
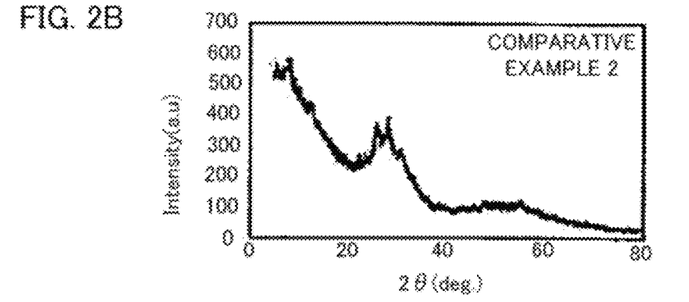
Figure 2C:
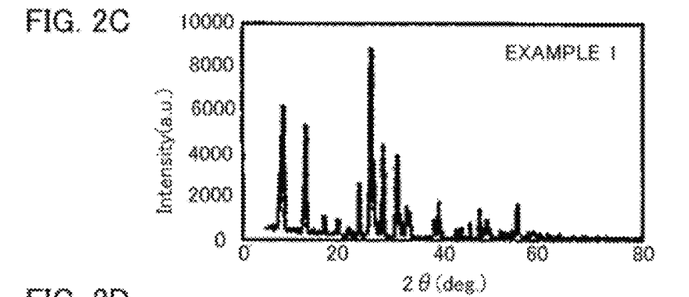
Figure 2D:
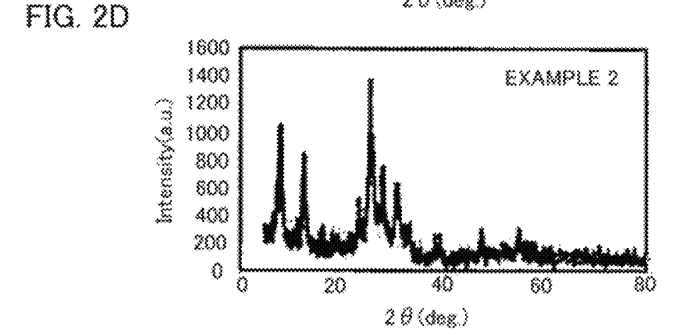
Figure 3:
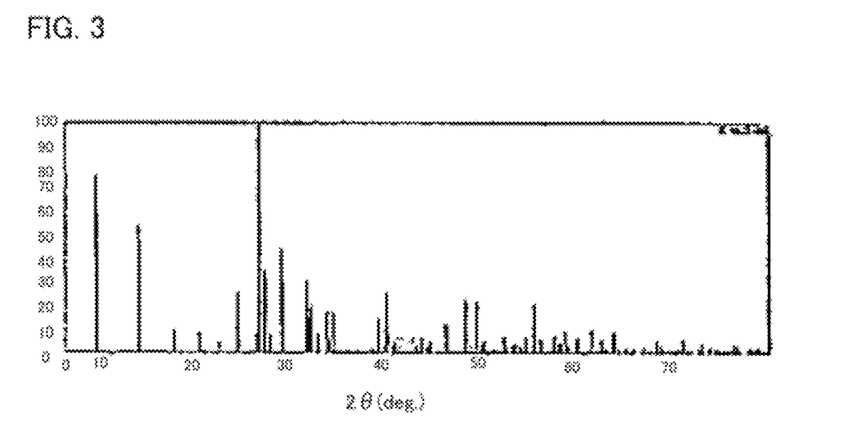
FIG. 3 is an XRD pattern of a $KNb_3O_8$ phase.
Figure 4:
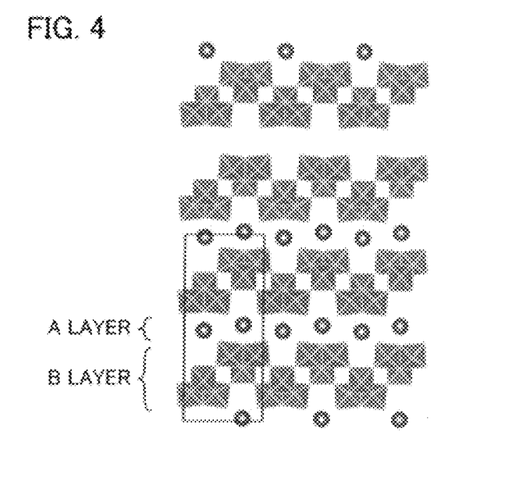
FIG. 4 is a schematic view showing a crystal structure of a $KNb_3O_8$ phase (orthorhombic crystal, space group Amam).

X-ray diffraction (XRD) measurement by using a CuKα ray was performed for the active substances obtained in Comparative Examples 1 and 2 and Examples 1 and 2. The results are shown in FIGS. 2A to 2D. As shown in FIGS. 2A, 2C and 2D, the patterns of the active substances of Comparative Example 1 and Examples 1 and 2 corresponded nearly to the pattern of a KNb₃O₈ phase shown in FIG. 3. Thus, it was confirmed that the active substances obtained in Comparative Example 1 and Examples 1 and 2 contained the KNb₃O₈ phase as the main body. In contrast, with regard to the pattern of the active substance obtained in Comparative Example 2, the disappearance of a peak of the KNb₃O₈ phase was observed. Thus, it was confirmed that the active substance of Comparative Example 1 composed of the KNb₃O₈ phase was amorphized by mechanochemical treatment. The main peaks of the KNb₃O₈ phase appeared in 2θ=8.35°, 12.99°, 16.75°, 19.50°, 23.78°, 26.14°, 26.63°, 28.48°, 31.21°, 31.62°, 32.22°, and 33.86°. Incidentally, FIG. 4 is a schematic view showing a crystal structure of the KNb₃O₈ phase (orthorhombic crystal, space group Amam). As shown in FIG. 4, the KNb₃O₈ phase has a layer structure in which an A layer comprising K and a B layer containing an NbO₆ octahedron were laminated.

Also, the crystallite size was calculated from full width at half maximum (FWHM) of 2θ=26.14° of the active substances obtained in Comparative Examples 1 and 2 and Examples 1 and 2 by using the Scherrer's formula described above. The results are shown in Table 1.

(SEM Observation)

Figure 5A:
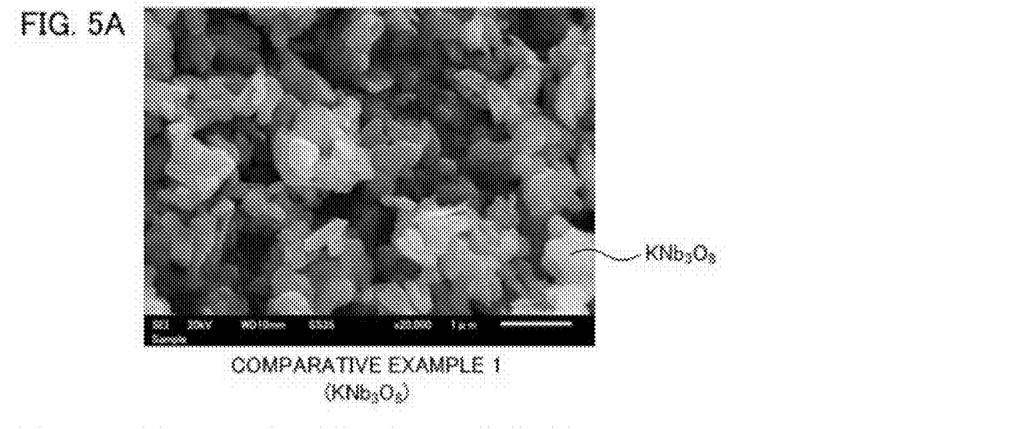
FIGS. 5A to 5C are results of observing SEM of active substances each obtained in Comparative Example and Examples 1 and 2.
Figure 5B:
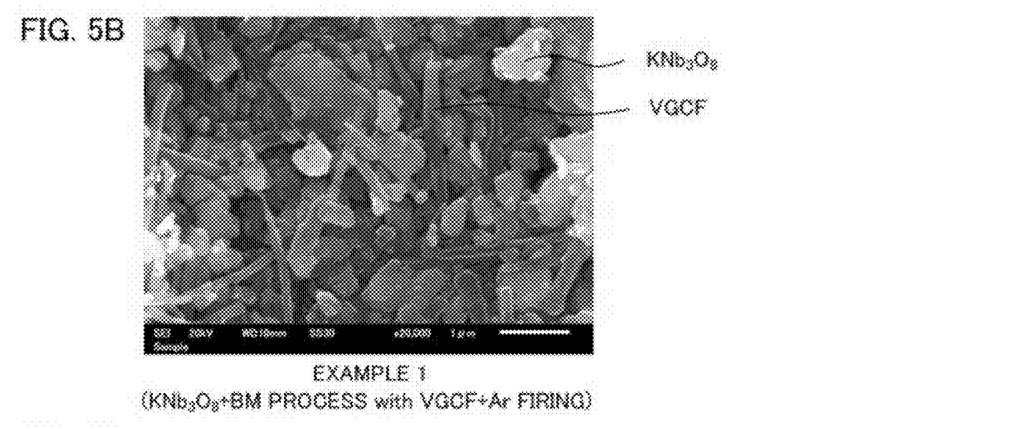
Figure 5C:
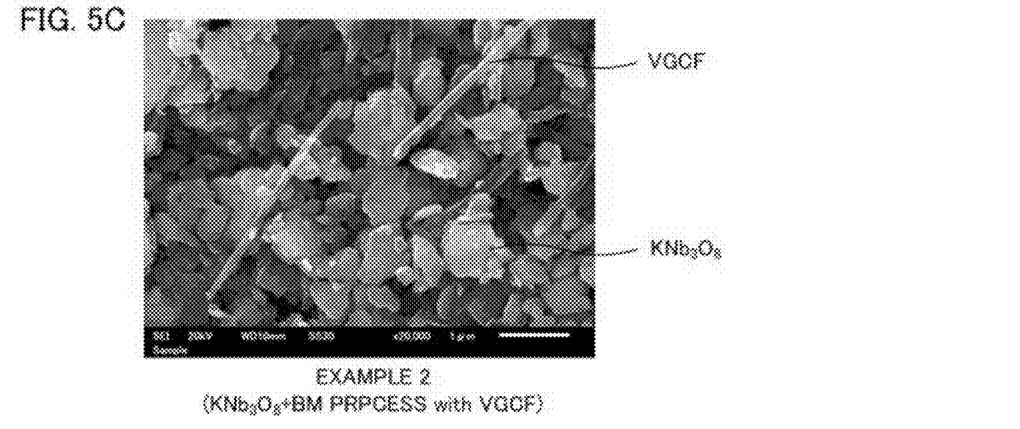
Figure 6A:
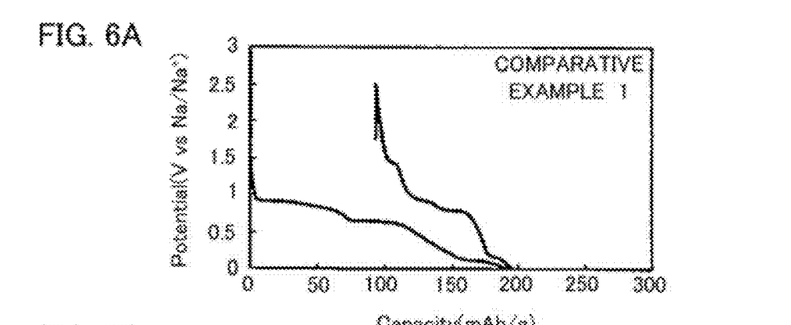
FIGS. 6A to 6D are results of a charge and discharge test of evaluation batteries (sodium ion batteries) using active substances each obtained in Comparative Examples 1 and 2 and Examples 1 and 2.
Figure 6B:
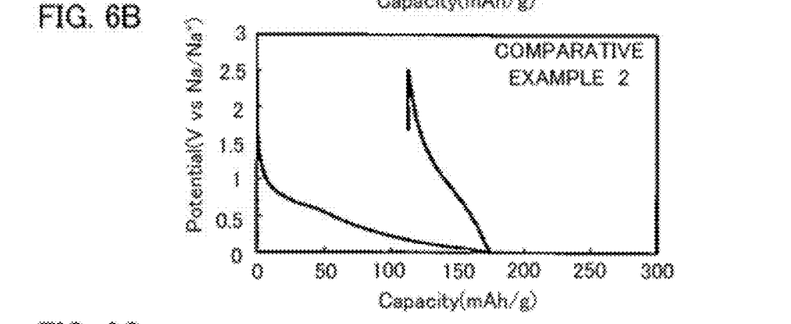
Figure 6C:
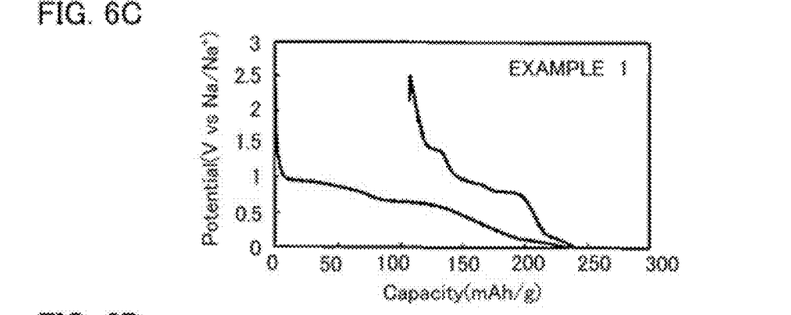
Figure 6D:
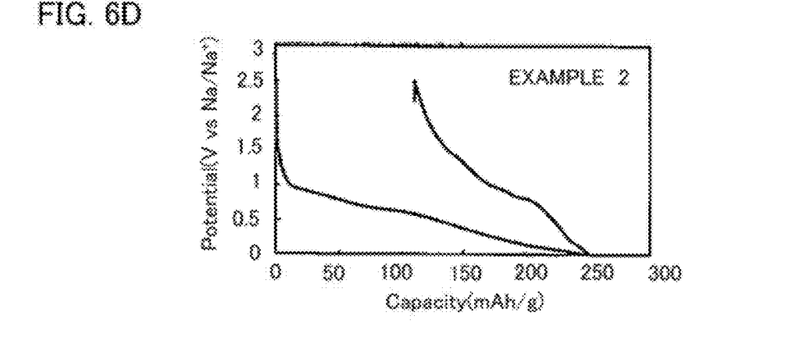

The active substances obtained in Comparative Example 1 and Examples 1 and 2 were observed by a scanning electron microscope (SEM). The results are shown in FIGS. 5A to 5C. As shown in FIGS. 5B and 5C, the primary particles of KNb₃O₃ and VGCF were dispersed while stuck closely by ball milling process, and it was confirmed that KNb₃O₈ and VGCF were composited.

(Charge and Discharge Test)

An evaluation battery using the active substance each obtained in Comparative Examples 1 and 2 and Examples 1 and 2 was produced. First, the obtained active substance, a conductive material (acetylene black), and a binder (polyvinylidene fluoride, PVDF) were mixed and kneaded at a weight ratio of active substance:conductive material:binder=85:10:5 to thereby obtain a paste. Next, the obtained paste was coated on a copper foil by a doctor blade, dried and pressed to thereby obtain a test electrode having a thickness of 20 μm.

Thereafter, a CR2032-type coin cell was used, the test electrode was used as a working electrode, metallic Na was used as a counter electrode, and a porous separator of polyethylene/polypropylene/polyethylene (a thickness of 25 μm) was used as a separator. A solution in which NaPF₆ was dissolved at a concentration of 1 mol/L in a solvent, in which EC (ethylene carbonate) and DEC (diethyl carbonate) were mixed by the same volume, was used as a liquid electrolyte.

Next, a charge and discharge test was performed for the obtained evaluation battery. Specifically, the test was performed on the conditions of an environmental temperature of 25° C. and a voltage range of 10 mV to 2.5 V. The electric current value was determined at 3 mA/g. Na desorption amount in the first cycle at this time was evaluated as reversible capacitance.

The rate characteristics (1 C/0.1 C) were evaluated from the ratio between Na desorption capacity during charge and discharge at an electric current value of 150 mA/g and Na desorption capacity during charge and discharge at an electric current value of 15 mA/g. The results of the reversible capacitance and the rate characteristics evaluation are shown in FIGS. 6A to 6D and Table 1.

TABLE 1

| | Crystallite (Å) | Carbon compositing | Reversible capacitance (mAh/g) | Rate characteristics | Potential control |
|---|---|---|---|---|---|
| Comparative Example 1 | 216 | Not performed | 108 | 0.37 | No |
| Comparative Example 2 | 48 | Not performed | 62 | 0.19 | Yes |
| Example 1 | 209 | Performed | 132 | 0.69 | No |
| Example 2 | 113 | Performed | 138 | 0.70 | Yes |

The rate characteristics (1 C/0.1 C) were 0.37 and 0.19 in Comparative Examples 1 and 2 respectively, whereas the rate characteristics improved dramatically up to 0.69 and 0.7 in Examples 1 and 2 respectively. It was confirmed that the rate characteristics were improved by compositing the KNb₃O₈ active substance and the carbon material with high crystallinity. As shown in Comparative Example 2, it was confirmed that only the reduction of the crystallite size of the KNb₃O₈ active substance brought no effect to an improvement in the rate characteristics.

The reversible capacitance was 108 mAh/g and 62 mAh/g in Comparative Examples 1 and 2 respectively, whereas the reversible capacitance improved up to 132 mAh/g and 138 mAh/g in Examples 1 and 2 respectively. It was confirmed that the reversible capacitance was improved by compositing the KNb₃O₈ active substance and the carbon material with high crystallinity. As shown in Comparative Example 2, it was confirmed that merely the reduction of the crystallite size of the KNb₃O₈ active substance brought no effect to an improvement in the reversible capacitance.

Plural potential flat parts existed in the charge and discharge curve of Example 1 and Comparative Example 1, whereas a potential flat part was allowed to disappear in the charge and discharge curve of Example 2 and Comparative Example 2 in which the crystallite size of the KNb₃O₈ phase was reduced. Therefore, it was confirmed that the charging state was easily monitored and controlled by voltage.

Reference Example 1

K₂CO₃ and Nb₂O₅ as raw materials were weighed at a molar ratio of K₂CO₃:Nb₂O₅=1:3, and kneaded in ethanol. Thereafter, the solution was molded into pellets, which were burned in a muffle furnace on the conditions of 800° C. and 40 hours. Thereafter, the pellets were further ground and molded, and burned again in a muffle furnace on the conditions of 800° C. and 40 hours. Thus, an active substance having a composition of KNb₃O₈ was obtained.

Reference Example 2

An active substance was obtained in the same manner as Reference Example 1 except for using TiO₂, K₂CO₃ and Nb₂O₅ as raw materials at a molar ratio of TiO₂:K₂CO₃:

$Nb_2O_5=0.01:0.995:3$. The composition of the obtained active substance corresponds to $x=0.005$ in $K(Nb_{3-x}Ti_x)O_8$.

Reference Examples 3 to 7

An active substance was obtained in the same manner as Reference Example 2 except for modifying the molar ratio of $TiO_2$, $K_2CO_3$ and $Nb_2O_5$ so as to correspond to $x=0.01$, 0.02, 0.03, 0.05 and 0.1 in $K(Nb_{3-x}Ti_x)O_8$.

[Evaluations]
(X-Ray Diffraction Measurement)

When X-ray diffraction (XRD) measurement by using a CuKα ray was performed for the active substances obtained in Reference Examples 1 to 7, the same peaks as the $KNb_3O_8$ phase were obtained. Thus, in Reference Examples 2 to 7, it was suggested that the $K(Nb_{3-x}Ti_x)O_8$ phase was obtained. An impurity phase ($KTiNbO_5$, $Ti_2Nb_6O_{12}$) was confirmed in Reference Examples 5 to 7, but an impurity phase was not confirmed in Reference Examples 2 to 4. This fact suggested that too large amount of Ti addition brought an impurity phase, not allowing a solid solution state to substitute with Nb.

(Charge and Discharge Test)

An evaluation battery (a sodium ion battery) was produced in the same manner as the above by using the active substance each obtained in Reference Examples 1 to 7. Next, a charge and discharge test was performed for the obtained evaluation batteries on the same conditions as Example 1. The charge and discharge efficiency η (%) was calculated from the ratio between Na insertion capacity and Na desorption capacity in the first cycle. Also, the rate characteristics (1 C/0.1 C) were evaluated on the same conditions as Example 1. The results of the charge and discharge efficiency and the rate characteristics evaluation are shown in Table 2.

TABLE 2

| | Ti substituted amount x | Impurity phase | Charge and discharge efficiency η (%) | Rate characteristics 1 C/0.1 C |
|---|---|---|---|---|
| Reference Example 1 | 0 | Not confirmed | 52.7 | 0.37 |
| Reference Example 2 | 0.005 | Not confirmed | 58.6 | 0.42 |
| Reference Example 3 | 0.01 | Not confirmed | 58.1 | 0.40 |
| Reference Example 4 | 0.02 | Not confirmed | 54.0 | 0.38 |
| Reference Example 5 | 0.03 | Confirmed | 52.1 | 0.33 |
| Reference Example 6 | 0.05 | Confirmed | 50.5 | 0.29 |
| Reference Example 7 | 0.1 | Confirmed | 47.9 | 0.27 |

As shown in Table 2, in Reference Examples 2 to 4, the charge and discharge efficiency and the rate characteristics improved as compared with Reference Example 1. The reason therefor is guessed to be that the substitution of part of pentavalent Nb ($Nb^{5+}$) with tetravalent Ti ($Ti^{4+}$) with different valence number improved electron conductivity. In contrast, in Reference Examples 5 to 7, the charge and discharge efficiency and the rate characteristics were equal to or less than Reference Example 1. The reason therefor is guessed to be that the presence of an impurity phase deteriorated electron conductivity and ion conductivity. Thus, it was confirmed that the substitution of Nb with another element with different valence number improved at least one of the charge and discharge efficiency and the rate characteristics.

Reference Example 8

The active substance obtained in Comparative Example 1 was stirred in 7 M-$HNO_3$ solution at room temperature for 3 days to ion-exchange K ion for H ion and then to obtain an active substance having a composition of $HNb_3O_8$.

Reference Example 9

The active substance obtained in Reference Example 8 was stirred in 0.1 M-NaOH solution at room temperature for 12 hours to ion-exchange H ion for Na ion and then to obtain an active substance having a composition of $NaNb_3O_8$.

Reference Example 10

The active substance obtained in Reference Example 8 was stirred in 1M-LiOH solution at room temperature for 3 days to ion-exchange H ion for Li ion and then to obtain an active substance having a composition of $LiNb_3O_8$.

Incidentally, in Reference Examples 8 to 10, since ion exchange was performed by using the active substance obtained in Comparative Example 1, a crystal structure was maintained.

[Evaluations]
(Charge and Discharge Test)

An evaluation battery (a sodium ion battery) was produced in the same manner as the above by using the active substance each obtained in Comparative Example 1 and Reference Examples 8 to 10. Next, a charge and discharge test was performed for the obtained evaluation battery. Specifically, charge and discharge were performed on the conditions of an environmental temperature of 25° C., a voltage range of from 0.1 V to 2.5 V and an electric current value of 3 mA/g. The results are shown in Table 3.

TABLE 3

| | Active substance material | Crystal system | Na insertion capacity (mAh/g) | Na desorption capacity (mAh/g) |
|---|---|---|---|---|
| Comparative Example 1 | $KNb_3O_8$ | Orthorhombic crystal | 172 | 96 |
| Reference Example 8 | $HNb_3O_8$ | Orthorhombic crystal | 295 | 162 |
| Reference Example 9 | $NaNb_3O_8$ | Orthorhombic crystal | 200 | 117 |
| Reference Example 10 | $LiNb_3O_8$ | Orthorhombic crystal | 249 | 121 |

As shown in Table 3, in Reference Examples 8 to 10, Na insertion capacity and Na desorption capacity improved as compared with Comparative Example 1. The reason therefor is guessed to be that the replacement of K ion with an ion smaller in ionic radius allowed a void, into which Na ion is insertable, to be formed. In this way, it was confirmed that the replacement of K ion with an ion smaller in ionic radius improved at least one of Na insertion capacity and Na desorption capacity.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . sodium ion battery

What is claimed is:

1. A sodium ion battery comprising:
a cathode active material layer containing a cathode active material;
a cathode active material layer containing an anode active material for the sodium ion battery, the anode active material comprising an active substance having an $MNb_3O_8$ phase belonging to an orthorhombic crystal (M is at least one kind of H, Li, Na and K);
an electrolyte layer formed between the cathode active material layer and the anode active material layer; and
a carbon material contacting with the active substance, the active substance and the carbon material being composited.

2. The sodium ion battery according to claim 1, wherein the carbon material is such that interlayer distance d002 is in the range of 3.36 Å to 3.5 Å and D/G ratio measured by Raman spectroscopy measurement is 0.8 or less.

3. The sodium ion battery according to claim 1, wherein crystallite size of the $MNb_3O_8$ phase is in the range of 30 Å to 120 Å.

4. The sodium ion battery according to claim 1, wherein crystallite size of the $MNb_3O_8$ phase is in the range of 30 Å to 113 Å.

* * * * *

UNITED STATES PATENT AND TRADEMARK OFFICE
CERTIFICATE OF CORRECTION

PATENT NO.         : 9,450,235 B2
APPLICATION NO.    : 14/817681
DATED              : September 20, 2016
INVENTOR(S)        : Hideki Nakayama It is certified that error appears in the above-identified patent and that said Letters Patent is hereby corrected as shown below:

In the Claims

In Claim 1, at Column 15, Line 5, change "a cathode active material layer" to "an anode active material layer".

Signed and Sealed this
Tenth Day of January, 2017

Michelle K. Lee
*Director of the United States Patent and Trademark Office*